United States Patent
Kistner et al.

[11] Patent Number: 5,797,212
[45] Date of Patent: Aug. 25, 1998

[54] FISHING GEAR HOLDER

[76] Inventors: Thomas Kistner, 30 Markie La.. Windsor, N.Y. 13865; Daren Dale Pilch, 60 High St., Walton, N.Y. 13856

[21] Appl. No.: 556,491

[22] Filed: Nov. 13, 1995

[51] Int. Cl.$^6$ .................................................. A01K 97/10
[52] U.S. Cl. ................................... 43/21.2; 224/922
[58] Field of Search ................... 43/21.2; 224/922, 224/200

[56] References Cited

U.S. PATENT DOCUMENTS

| | | | |
|---|---|---|---|
| 1,761,497 | 6/1930 | Smith | 224/922 |
| 2,576,624 | 11/1951 | Miller | 43/21.2 |
| 2,781,958 | 2/1957 | Lewandowski | 224/922 |
| 2,995,855 | 8/1961 | Bell | 43/21.2 |
| 3,021,101 | 2/1962 | Gliebe | 43/21.2 |
| 3,282,482 | 11/1966 | Scharsu | 224/922 |
| 3,497,118 | 2/1970 | Najjar | 224/196 |
| 3,874,573 | 4/1975 | Fruscella | 43/21.2 |
| 4,569,466 | 2/1986 | Webber | 224/922 |
| 4,739,914 | 4/1988 | Pothetes | 224/922 |
| 5,024,018 | 6/1991 | Ferrigno | 43/21.2 |
| 5,105,574 | 4/1992 | Fast | 43/21.2 |

*Primary Examiner*—Kurt Rowan
*Attorney, Agent, or Firm*—Richard G. Stephens

[57] ABSTRACT

A portable fishing gear holder comprises a single piece of plastic having attachment means at its upper end to readily attach the device to any of many types of clothing, a plurality of forwardly-extending spring arms adapted to grasp and hold the handle of a standard fishing rod, a lower tongue acting as a shelf to limit downward movement of such a rod, and one or more hooks from which various articles of fishing gear may be suspended.

5 Claims, 3 Drawing Sheets

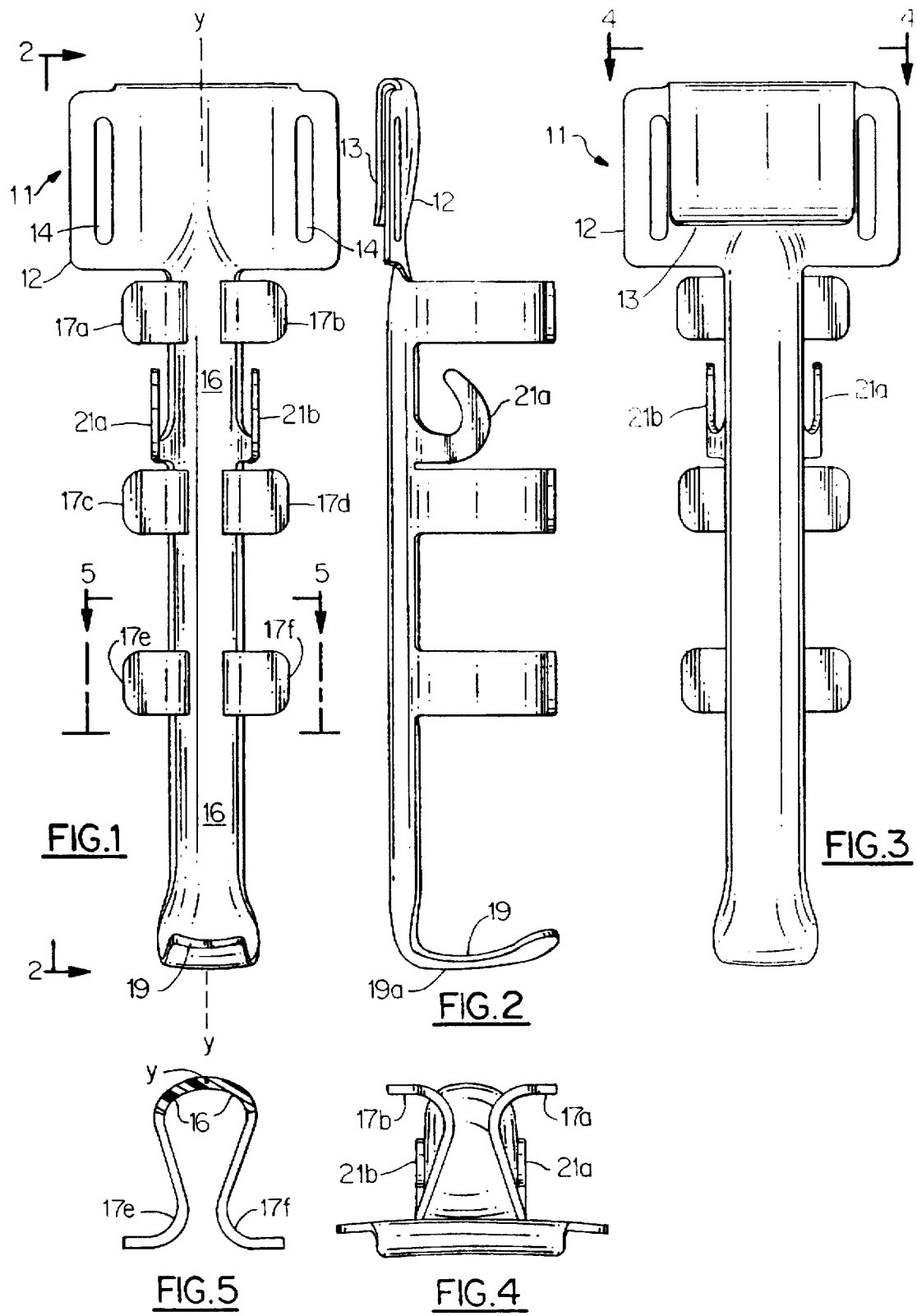

FISHING GEAR HOLDER

BACKGROUND OF THE INVENTION

Our invention relates to fishing gear holding apparatus, and more particularly, to a portable implement or caddy which may be worn or carried by a user to support and carry a fishing rod and various other articles of fishing equipment frequently used by fisherman. The invention is especially intended for use by fisherman who stand and/or walk while fishing in a stream or at the edge of a lake or other body of water. In most of the ensuing description the invention may be simply termed a fishing rod holder, but it should be kept in mind that many varied items of fishing equipment also may be carried by the device of the invention.

Many types of fishing desirably involve pluralities or sets of operations which a normal person having only two hands finds difficult to perform. For example, if a fly fisherman standing in a stream catches and reels in a fish, he ordinarily wishes to remove the fish, either to return it to the stream, or to put in a creel or bucket. The act of removing a hook from a live fish's mouth requires two hands, and hence the fisherman finds it difficult to remove a hook while continuing to support his fishing rod. One alternative is to wade out of the stream to dry land where he can lay all of his equipment on the ground. That strategm is anathema to most experienced fisherman because wading out of the stream is likely to stir up mud and encourage all fish to leave that fishing area. Thus it becomes desirable to provide a device which so supports various items of fishing equipment that the two-handed user can perform numerous acts which he otherwise could not conveniently perform.

Fisherman use a wide variety of types and sizes of fishing rods, and one object of the invention is to provide a fishing gear holder which will readily accommodate or be useful with a wide number of types and sizes of fishing rods. One important object of the invention is to provide a fishing rod holder which may be worn and carried in a secure fashion with any of a variety of different articles of clothing which fisherman commonly use. Some prior art fishing rod holders require mounting on a belt worn by the user. Some fisherman wear waders with which a belt is not usually worn. As will be seen below, the holder of the present invention can be worn not only with a typical belt of the type frequently encircling a user's hips, but with chest waders, or bib overalls, or with many plain shirts and pants, and providing a fishing rod holder with such added utility is one important feature of the invention. Provision of a device which need not be made differently for right-handed and left-handed users, and which will operate similarly for either type of user is another object of the invention. Another object of the invention is to provide a fishing gear holder which is simple and sturdy, economical to manufacture, preferably from a single piece of material, and, importantly, impervious to rust and rough handling.

BRIEF DESCRIPTION OF THE PRIOR ART

The broad idea of providing a one-piece plastic device for supporting a fishing rod is not per se new, such a device being shown in Fruscella et al U.S. Pat. No. 3,874,573, but the holder of the present invention is believed to provide many advantages which will be mentioned below as the description proceeds.

BRIEF DESCRIPTION OF THE DRAWING FIGURES

FIG. 1 is a front elevation view of a preferred embodiment of the invention.

FIG. 2 is a side elevation view taken at lines 2—2 in FIG. 1.

FIG. 3 is rear elevation view of the embodiment of FIGS. 1-4, and

FIG. 4 is a top view taken at lines 4—4 in FIG. 3.

FIG. 5 is a downward section view taken at lines 5—5 in FIG. 3.

Figure 6:
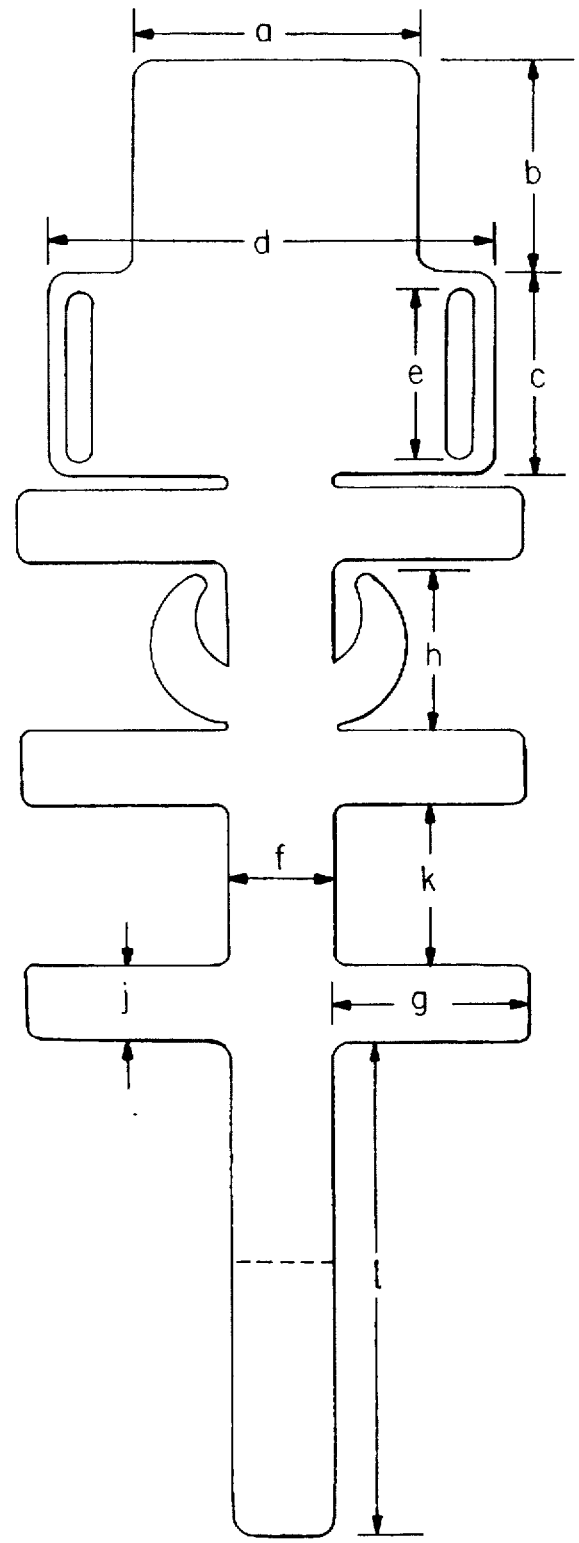
FIG. 6 is an unrolled view useful in describing the dimension of a preferred embodiment of the invention.

In FIG. 1 a vertically-extending y-axis shown in dashed lines is provided solely to facilitate accurate description of the preferred embodiment shown in the drawing. The device of FIGS. 1–9 is preferably made symmetrical about the y—y axis shown in FIG. 1, though it is by no means necessary that the device be symmetrical.

DETAILED DESCRIPTION

Referring now to FIGS. 1–7, the holder 10 preferably comprises a single piece of plastic, such as polypropylene, high-density polyethylene, polyvinylchloride, or other suitable plastic material, molded or formed to provide the entire holder as a one-piece unit. The device theoretically may be formed as separate pieces and then assembled into a single unit, but with no apparent advantage. The device is preferably injection-molded to provide economical mass production, but the device can be entirely formed, if desired, by heating and bending a piece cut (with a jig-saw or band-saw) from a sheet of polypropylene sheet approximately ⅛ inch thick. {Give mfr and catalog or type no. of sheet you used to make prototypes} High impact polystyrene can instead be used.

As viewed in FIG. 1 it will be seen that the preferred form of the device is precisely symmetrical about the y-axis. The single plastic piece includes attachment means 11 at its upper edge, those attachment means being shown as comprising a front pad 12 having a generally rectangular shape, with a stiff, folded-over rear tab or rigid flap 13. The front pad 12 carries a pair of spaced-apart vertically-extending slot apertures 14,14 which may accommodate a belt (not shown in FIGS. 1–4) worn by the user, thereby to support holder 10 on the user's person. Alternatively, rear folded-over rigid flap or tab 13 may be inserted over the waistband of pants worn by the user, or into a hip-pocket of trousers worn by the user, a shirt pocket of the user, or, importantly, over the upper edge of chest waders or bib overalls worn by the user, none of the mentioned articles of user clothing being shown in FIGS. 1–4. Provision of attachment means which allows rapid and easy installation of the device on the fisherman's body under the widely varying conditions given by different types of dress by different individuals is believed to be extremely desirable and an important feature of the invention. It also should be noted that the mentioned articles of clothing are all quite common fisherman costume items, and none of the different manners in which the holder may attached to fisherman garb requires any close fitting to size. Hence a given holder of ideal size for a grown man can as well be readily used by his wife or his young sons and daughters.

In between the upper attachment means and the lower end of the device, the holder comprises a central strip portion 16 having a generally semi-circular or trough-like cross-section, as best seen in FIG. 5. The provision of such a cross section stiffens the device against bending in the fore and aft directions, i.e. toward and away from the observer as viewed in FIG. 1, and it facilitates the holding in the device of numerous objects having a generally circular cross-section, such as many fishing rod handles. It is by no means necessary that the mentioned cross-section be precisely semi-circular. As clearly seen in FIGS. 1–4, a plurality of arm members 17a to 17f are provided to extend generally forwardly in pairs from the semi-circular central rear area 16, and as best seen in FIG. 4, the arms of each pair curve away from each other, thereby providing an arm pair spacing at a nearest point which is less than the spacing of the arms where they join rear strip portion 16. It will be apparent that an object forced between the arms of a pair will be gripped by those arms with a force dependent upon both the size and position of the object being gripped. Because the arms of a pair extend partially laterally as well as outwardly (as viewed in FIG. 5), it can be seen that a pair of arms which grip an object between them tend also to urge the object rearwardly, i.e. toward plate 12 and tab 13.

Figure 7:
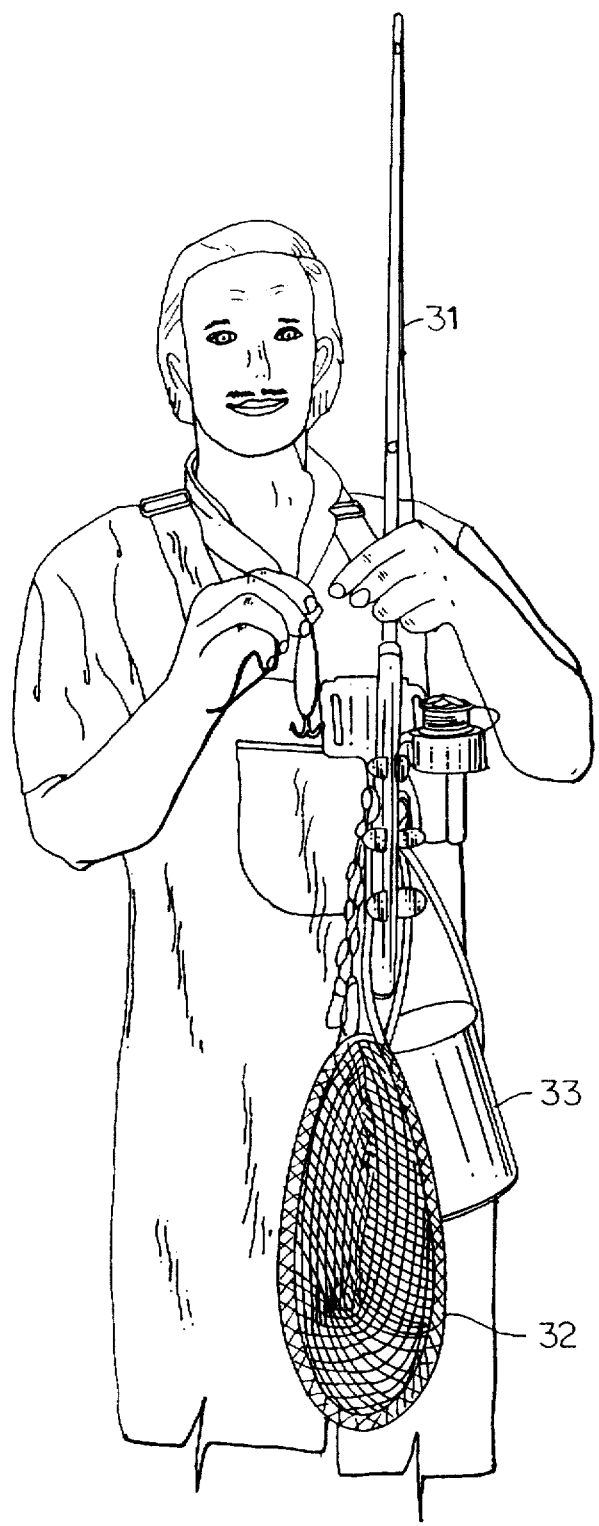
FIG. 7 is a partial front view illustrating a fisherman employing the invention to carry a plurality of articles while his hands are free for other tasks.

Preferred dimensions of the presently preferred embodiment of the invention may be given and understood most readily by reference to a flat, or unrolled piece of plastic sheet of the nature shown in FIG. 7, even though it is preferred that the holder be formed for quantity production by injection molding. Such dimensions are those which may be cut from a flat piece of plastic sheet, prior to the central tube portion being formed to a semi-cylindrical shape, and prior to the arms and hook portions being formed. In one successful prototype model of the invention various dimensions identified by letters in FIGS. 7 had the following exemplary dimensions:

| Dimension | Inch | Cm. | Dimension | Inch | Cm. |
|---|---|---|---|---|---|
| a | 3.0 | 7.62 | g | 2.31 | 5.87 |
| b | 2.25 | 5.72 | h | 1.88 | 4.76 |
| c | 2.87 | 7.29 | i | 0.94 | 2.38 |
| d | 4.5 | 11.43 | j | 0.94 | 2.38 |
| e | 2.0 | 5.08 | k | 2.0 | 5.08 |
| f | 1.38 | 3.49 | l | 3.75 | 9.53 |

The holder is shown provided with three pairs of forwardly-extending arms 17a–17f, the arms of each pair being shown extending from the rear half-tube or trough portion 16 of the device mutually symmetrically on opposite sides of the y-axis. The rear trough or half-tube portion of the caddy is quite stiff, having no appreciable resilience insofar as operation is concerned, but not so stiff as to be brittle, of course. The arms 17a–17f which extend forwardly from the trough portion have substantial resilience, however, so that they act as spring arms. Each arm extends forwardly from the rear trough portion, first curving laterally inwardly toward the y-axis as well as forwardly, and then changing direction to present a rounded bend away from the y-axis and away from the companion bend of the other arm of the pair. It will be apparent that a cylindrical object such as a broomstick, billy club, or fishing rod handle forced between a pair of such arms will be gripped by the arms with a spring force. It may be noted that because the rounded bend on each plastic arm has a substantial radius, no sharp corners (and, of course, no hard metal surfaces) are urged against a fishing rod to possibly damage the rod.

Figure 8:
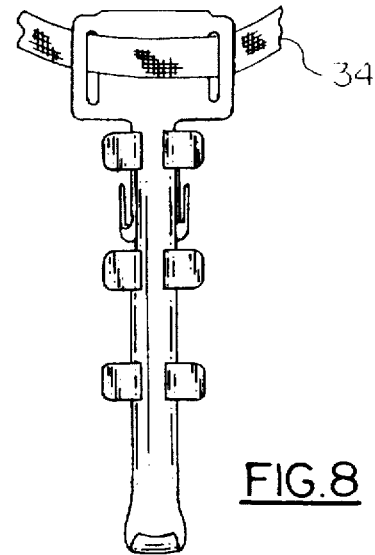
FIG. 8 is a partial view showing the holder of the invention installed on a belt, which is only partly shown.
Figure 9:
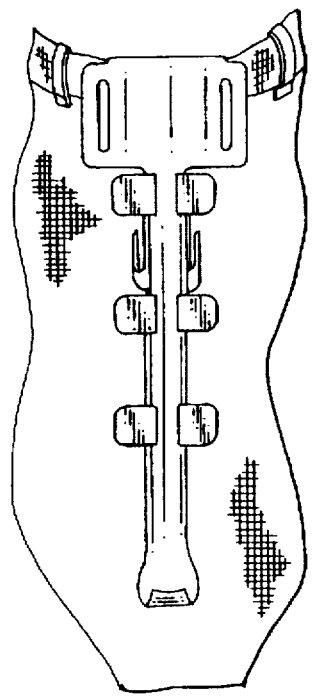
FIG. 9 is a partial view showing the holder installed over an upper edge of a wearer's trousers, which are only partly shown.

The lower end of the caddy comprises a forwardly extending shelf or platform 19 which supports the lower end of a fishing rod carried in the caddy and limits downward movement of the same. Shelf 19 preferably presents a seat having a slightly lowered or slightly recessed central area 19a, so that the end of a fishing rod handle seated in such a recess tends to be captured, making the rod tend to be not removable from the caddy unless the rod is lifted very slightly. The dimensions between the extending arms is fashioned, given the resiliency of the plastic material used, so that a generally cylindrical fishing rod handle having a diameter of approximately 0.75 inch (1.9 cm.) seated between such arms may be inserted therebetween or removed therefrom with an outward pull of the order of roughly ten pounds. With that order of resilience a rod will be held securely without attention from a fisherman while the fisherman moves to perform any one of a number of tasks, but readily removable from the holder when the fisherman desires that. As well as a plurality of pairs of spring arms, the holder also includes a plurality (only two are shown) of hook arms 21a, 21b from which any of a large variety of articles of fishing equipment may be temporarily suspended, yet readily removed when desired. Exemplifying typical use of the invention, a fisherman shown in FIG. 7 has the holder of the invention supported by rear pad 13 being slipped over the upper edge of the wearer's bib overalls. The trio of pairs of arms grip the handle of a fishing rod 31 and keep the rod erect while the fisherman uses his hands to work with an artificial bait. Simultaneously, a conventional fishing net 32 and a bait can 33 are suspended from hooks 21a, 21b of the holder. FIG. 8 shows the invention attached to the belt 34 of a wearer, and FIG. 9 shows the invention supported by the upper edge of trousers of a wearer.

It is deemed important that the holder be attachable to a user near the upper end of the holder, and that any hook means such as those shown at 21a, 21b be located below the attachment means. It is deemed desirable that the holder have a modest width, of the order shown, so that it not interfere with the user's walking even though it is located on the user's front side.

While a preferred embodiment has been shown and described, it should be recognized that various changes which could be made will become readily apparent to those skilled in the art upon a perusal of this disclosure.

The embodiments of the invention in which an exclusive property or or privilege is claimed are defined as follows:

1. A fishing gear holder or caddy which comprises, in combination: a unitary plastic article comprising, in combination: a vertically-extending central portion having an upper end, a lower end and a shelf portion; attachment means for detachably attaching said upper end of said central strip portion to a users article of clothing; at least one pair of arms spaced mutually apart and extending generally forward from said central strip portion, said arms being adapted to resiliently and frictionally grasp one or more objects pressed between said arms, said lower end of said central strip portion terminating in said shelf portion, which extends horizontally away from said central strip portion in a substantially perpendicular direction, whereby said shelf portion may butt against the handle end of a fishing rod or other member to preclude lowering of said handle end below said shelf portion and said rod may be pivoted with said handle end resting on said shelf portion between a vertical frictionally-gripped position between said arms and a free position beyond the outer ends of said arms, wherein each of said arms of said pair of arms extends first outwardly from said central strip portion and horizontally toward the other of said pair of arms, to a terminal portion which curves horizontally away from the other of said pair of arms.

2. The fishing gear holder or caddy of claim 1 wherein said attachment means comprises a first pad portion having a full fold extending to a second pad portion, said first pad portion having a pair of spaced-apart through slots to accommodate a belt.

3. The fishing gear holder or caddy of claim 1 wherein each of said arms of said pair extends outwardly from an opposite edge of said central strip portion.

4. The fishing gear holder or caddy of claim 1 having at least one pair of curved tabs extending forwardly from opposite edges of said central strip portion to act as hooks from which selected items of gear may be suspended.

5. The holder of claim 2 where said second pad portion is formed to lie closely parallel to said first pad portion, and thereby be capable of gripping a layer of cloth inserted between said first and second pad portions.

* * * * *